United States Patent
Hagiwara

(10) Patent No.: US 10,793,679 B2
(45) Date of Patent: Oct. 6, 2020

(54) RADICALLY CURABLE ORGANOSILOXANE GRAFT POLYVINYL ALCOHOL POLYMER AND PROCESS FOR PRODUCING SAME

(71) Applicant: SHIN-ETSU CHEMICAL CO., LTD., Tokyo (JP)

(72) Inventor: Mamoru Hagiwara, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 37 days.

(21) Appl. No.: 16/266,417

(22) Filed: Feb. 4, 2019

(65) Prior Publication Data

US 2019/0256663 A1   Aug. 22, 2019

(30) Foreign Application Priority Data

Feb. 19, 2018   (JP) ................. 2018-027320

(51) Int. Cl.

| C08G 77/442 | (2006.01) |
| C08G 18/71 | (2006.01) |
| C08G 18/81 | (2006.01) |
| C08G 18/62 | (2006.01) |
| C08G 81/02 | (2006.01) |

(52) U.S. Cl.
CPC ....... *C08G 77/442* (2013.01); *C08G 18/6212* (2013.01); *C08G 18/718* (2013.01); *C08G 18/8116* (2013.01); *C08G 81/024* (2013.01)

(58) Field of Classification Search
CPC .. C08G 18/718; C08G 18/6212; C08F 116/06
See application file for complete search history.

(56) References Cited

U.S. PATENT DOCUMENTS

| 4,665,123 A | 5/1987 | Goldenberg |
| 4,670,506 A | 6/1987 | Goldenberg et al. |
| 4,978,713 A | 12/1990 | Goldenberg |
| 5,010,155 A | 4/1991 | Mueller |
| 5,508,317 A | 4/1996 | Muller |
| 5,807,927 A | 9/1998 | Stockinger et al. |
| 2017/0327605 A1 | 11/2017 | Hagiwara |
| 2018/0099480 A1 | 4/2018 | Kusumoto et al. |

FOREIGN PATENT DOCUMENTS

| EP | 0 216 074 A2 | 4/1987 |
| EP | 0 321 403 A2 | 6/1989 |
| EP | 0 362 137 A2 | 4/1990 |
| EP | 3 246 342 A1 | 11/2017 |
| JP | 2914872 B2 | 7/1999 |
| JP | 2011-246642 A | 12/2011 |
| JP | 2017-203127 A | 11/2017 |
| WO | 96/24073 A1 | 8/1996 |
| WO | 2016/204181 A1 | 12/2016 |

OTHER PUBLICATIONS

Jun. 19, 2019 Extended European Search Report issued in European Patent Application No. 19155410.4.

*Primary Examiner* — Jeffrey C Mullis
(74) *Attorney, Agent, or Firm* — Oliff PLC

(57) ABSTRACT

The present invention is a radically curable organosiloxane graft polyvinyl alcohol polymer having structural units represented by both of the following general formula (1) and general formula (2). The present invention provides a radically curable organosiloxane graft polyvinyl alcohol polymer having general properties such as film-forming property and transparency, excellent handleability as a liquid material since solubility in an organic solvent is high, and both of solvent resistance and moldability of the obtained film.

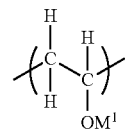

(1)

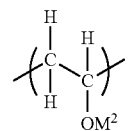

(2)

17 Claims, 1 Drawing Sheet

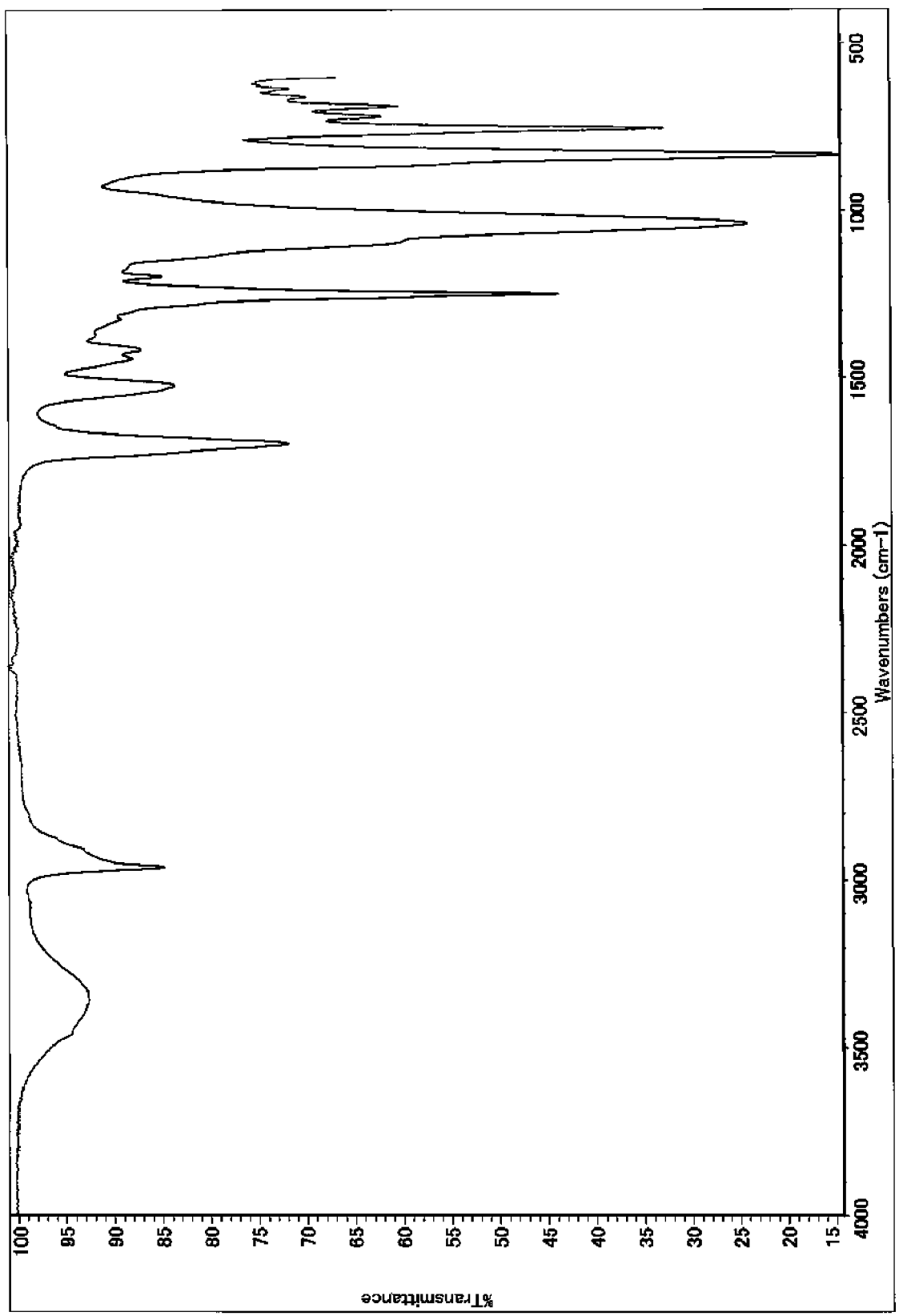

RADICALLY CURABLE ORGANOSILOXANE GRAFT POLYVINYL ALCOHOL POLYMER AND PROCESS FOR PRODUCING SAME

TECHNICAL FIELD

The present invention relates to a radically curable organosiloxane graft polyvinyl alcohol polymer, and particularly to a novel radically curable organosiloxane graft polyvinyl alcohol polymer and a process for producing the same.

BACKGROUND ART

Polyvinyl alcohol is a thermoplastic polymer material having excellent gas barrier properties and transparency. Its glass transition temperature is relatively low as about 80° C. and excellent in heat moldability, so that it is widely used as a raw material for films, sheets, containers and the like. It is also used for improving oil resistance and gas barrier properties by being coated on other resin films or sheets. However, there are problems that polyvinyl alcohol has poor solubility in common organic solvents, and handleability as a liquid material is extremely poor. In addition, it reacts poorly with a modifying agent for imparting a new function, and modification of the material is difficult and its application is limited. Accordingly, it has been desired to develop polyvinyl alcohol improved in solvent solubility and having extremely good handleability as a liquid material while maintaining properties peculiar to polyvinyl alcohol.

For the purpose of solving this problem, Patent Document 1 and Patent Document 2 disclose a substituted silylalkyl carbamate polyvinyl alcohol as a material having both properties of general properties of polyvinyl alcohol such as film-forming property, toughness, excellent gas barrier properties, transparency and the like, and properties of silicone having a branched structure such as high solubility in an organic solvent and excellent handleability as a liquid material.

However, none of these materials have a radically curable site in the molecule, so that solvent resistance and moldability of the obtained coating film cannot be obtained, and these materials are insufficient as a coating agent or a curable resin.

In Patent Document 3, a material to which the above characteristics are imparted by introducing a radically curable group into general polyvinyl alcohol has been proposed, but there is no example in which silicone is introduced into the molecular structure and it cannot be applied to applications requiring oxygen permeability, water repellency, and leveling property in coating.

CITATION LIST

Patent Literatures

Patent document 1: JP 2011-246642A
Patent document 2: JP 2017-203127A
Patent document 3: JP 2914872B2

SUMMARY OF INVENTION

Technical Problem

The present invention has been made to solve the above-mentioned problems, and an object thereof is to provide a radically curable organosiloxane graft polyvinyl alcohol polymer having general properties such as film-forming property, transparency, solubility in an organic solvent and the like. Another object is to provide a process for producing the radically curable organosiloxane graft polyvinyl alcohol polymer for producing it efficiently with an industrially low cost.

Solution to Problem

In order to solve the above problems, the present invention provides a radically curable organosiloxane graft polyvinyl alcohol polymer which comprises structural units represented by both of the following general formula (1) and general formula (2),

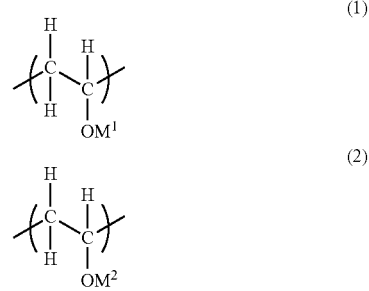

wherein, $M^1$ represents a siloxane group represented by the following general formula (3) and/or general formula (4); and $M^2$ represents an organic group having an unsaturated group represented by the following general formula (5),

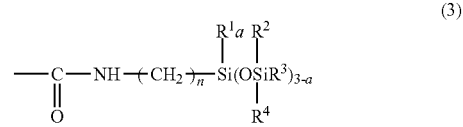

wherein, $R^1$, $R^2$, $R^3$, and $R^4$ each represent a monovalent organic group having 1 to 6 carbon atoms; "n" represents an integer of 1 to 10; and "a" represents an integer of 0 to 2,

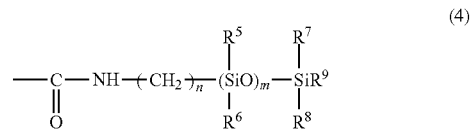

wherein, $R^5$, $R^6$, $R^7$, $R^8$, and $R^9$ each represent a monovalent organic group having 1 to 6 carbon atoms; "n" represents an integer of 1 to 10; and "m" represents an integer of 1 to 20,

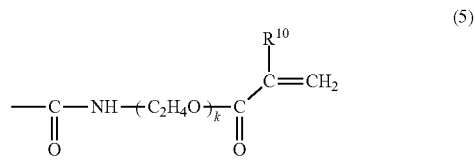

wherein, $R^{10}$ represents hydrogen or a methyl group; and "k" represents 1 or 2.

When such a radically curable organosiloxane graft polyvinyl alcohol polymer is employed, it becomes a material having general properties of polyvinyl alcohol such as film-forming property, transparency and the like, and properties of a silicone such as high solubility in an organic solvent and excellent handleability as a liquid material. Further the material has properties of the obtainable coating film such as solvent resistance and moldability together. Therefore, it can be suitably used as cosmetic, adhesive, paint and the like.

It is also preferable to further have a structural unit represented by the following general formula (6),

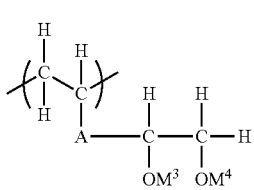

(6)

wherein, $M^3$ and $M^4$ each represent a hydrogen atom, an acetyl group or a siloxane group represented by the above general formula (3) and/or general formula (4), at least one of which is a siloxane group represented by the above general formula (3) or general formula (4), and "A" represents a single bond or a linking group.

When such a radically curable organosiloxane graft polyvinyl alcohol polymer is employed, by lowering high crystallinity of polyvinyl alcohol, solubility in an organic solvent increases and reactivity with a modifying agent becomes higher, so that it becomes a material which is inexpensive and excellent.

It is also preferable that the radically curable organosiloxane graft polyvinyl alcohol polymer has a number average molecular weight (Mn) of 5,000 to 500,000 as measured by GPC in terms of polystyrene.

When such a number average molecular weight is employed, film strength, handleability and solubility become more excellent.

In the general formula (3), it is preferably a material in which $R^2$, $R^3$, and $R^4$ are methyl groups, n=3 and a=0.

In the general formula (4), it is preferably a material in which $R^5$, $R^6$, $R^7$, and $R^8$ are methyl groups, $R^9$ is a butyl group, n=3 and m=4.

In the general formula (5), it is preferably a material in which $R^{10}$ is a methyl group, and k=1.

When such a radically curable organosiloxane graft polyvinyl alcohol polymer is employed, productivity, reactivity and the like become more excellent.

In the present invention, it is further provided a process for producing a radically curable organosiloxane graft polyvinyl alcohol polymer which comprises reacting at least a polyvinyl alcohol resin compound containing a structural unit represented by the following general formula (7), an organopolysiloxane containing an isocyanate group represented by the following general formula (8) and/or general formula (9), and an unsaturated compound containing an isocyanate group represented by the following general formula (10) with each other,

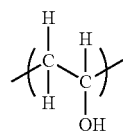

(7)

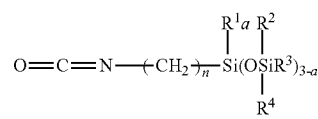

(8)

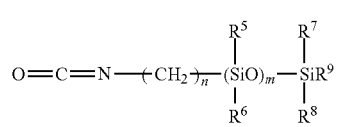

(9)

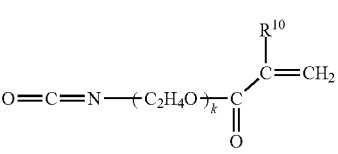

(10)

wherein, $R^1$, $R^2$, $R^3$, $R^4$, $R^5$, $R^6$, $R^7$, $R^8$, and $R^9$ each represent a monovalent organic group having 1 to 6 carbon atoms; $R^{10}$ represents hydrogen or a methyl group; "k" represents 1 or 2; "n" represents an integer of 1 to 10; "m" represents an integer of 1 to 20; and "a" represents an integer of 0 to 2.

When the process for producing a radically curable organosiloxane graft polyvinyl alcohol polymer of the present invention is employed, the radically curable organosiloxane graft polyvinyl alcohol polymer of the present invention can be produced with good efficiency and industrially with a low cost.

It is preferable to further react with a polyvinyl alcohol resin compound containing a structural unit represented by the following general formula (11),

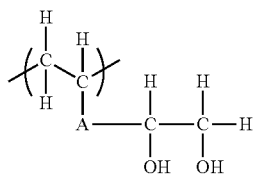

(11)

wherein, "A" represents a single bond or a linking group.

When the polyvinyl alcohol resin compound containing such a structural unit is employed, a radically curable organosiloxane graft polyvinyl alcohol polymer in which solubility in an organic solvent is increased, reactivity with a modifying agent is higher, and it becomes inexpensive and an excellent material can be produced more easily.

In addition, it is preferable that the organopolysiloxane containing an isocyanate group represented by the general formula (8) is tris(trimethylsiloxy)silylpropyl isocyanate, $R^{10}$ of the unsaturated compound containing an isocyanate group represented by the general formula (10) is a methyl group, and k=1.

When such a process for producing a radically curable organosiloxane graft polyvinyl alcohol polymer is employed, a radically curable organosiloxane graft polyvinyl alcohol polymer having a higher modification rate can be obtained efficiently from the viewpoints of productivity and reactivity.

Advantageous Effects of Invention

According to the radically curable organosiloxane graft polyvinyl alcohol polymer of the present invention, it becomes a material having general properties of the polyvinyl alcohol such as film-forming property, transparency and the like, and properties of the silicone such as high solubility in an organic solvent and excellent handleability as a liquid material, and further properties of the obtainable coating film such as solvent resistance and moldability together. Therefore, it can be suitably used as cosmetics, adhesives, paints and the like.

In addition, according to the process for producing a radically curable organosiloxane graft polyvinyl alcohol polymer of the present invention, an isocyanate group having high reactivity and a hydroxyl group of the polyvinyl alcohol resin compound can be more effectively reacted. Accordingly, the organosiloxane graft polyvinyl alcohol polymer of the present invention can be produced easily and good efficiency, and further can be obtained industrially with a low cost, i.e., inexpensively.

BRIEF DESCRIPTION OF DRAWING

The FIGURE is a view showing the result of the IR analysis of the polymer obtained in Example 1.

DESCRIPTION OF EMBODIMENTS

As mentioned above, it has been desired to develop a radically curable organosiloxane grafted polyvinyl alcohol having improved solubility in a solvent and extremely good handleability as a liquid material while maintaining properties peculiar to the polyvinyl alcohol and a process for producing the same.

The present inventors have intensively studied to develop a radically curable siloxane-containing polyvinyl alcohol having both properties of a polyvinyl alcohol-based polymer and a silicone, and as a result, they have found that by reacting a hydroxyl group of a polyvinyl alcohol resin compound containing a structural unit represented by the general formula (7) mentioned below, an organopolysiloxane containing an isocyanate group represented by the general formula (8) and/or general formula (9) mentioned below, and an unsaturated compound containing an isocyanate group represented by the general formula (10) mentioned below together, the hydroxyl groups of the polyvinyl alcohol resin compound are effectively reacted with the organopolysiloxane containing an isocyanate group and the unsaturated compound containing an isocyanate group so that a radically curable organosiloxane graft polyvinyl alcohol polymer having both the structural units represented by the general formula (1) and general formula (2) mentioned below can be easily and effectively obtained. In addition, the present inventors have found that the organosiloxane graft polyvinyl alcohol polymer thus obtained is a novel material, and becomes a material which has general properties of the polyvinyl alcohol such as film-forming property, transparency and the like, and properties of the silicone such as high solubility in an organic solvent and excellent handleability as a liquid material, and further properties of the obtained coating film such as solvent resistance and moldability, whereby completed the present invention.

That is, the present invention is a radically curable organosiloxane graft polyvinyl alcohol polymer having both structural units represented by both of the following general formula (1) and general formula (2),

wherein, $M^1$ represents a siloxane group represented by the following general formula (3) and/or general formula (4); and $M^2$ represents an organic group having an unsaturated group represented by the following general formula (5),

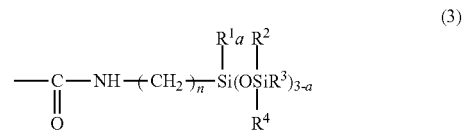

wherein, $R^1$, $R^2$, $R^3$, and $R^4$ each represent a monovalent organic group having 1 to 6 carbon atoms; "n" represents an integer of 1 to 10; and "a" represents an integer of 0 to 2,

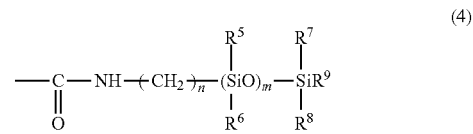

wherein, $R^5$, $R^6$, $R^7$, $R^8$, and $R^9$ each represent a monovalent organic group having 1 to 6 carbon atoms; "n" represents an integer of 1 to 10; and "m" represents an integer of 1 to 20,

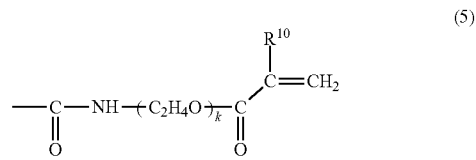

wherein, $R^{10}$ represents hydrogen or a methyl group; and "k" represents 1 or 2.

Hereinafter, the present invention will be explained in detail, but the present invention is not limited thereto. In the present invention, as a solvent to be used for measurement of gel permeation chromatography (GPC), tetrahydrofuran (THF) is to be used.

[Radically Curable Organosiloxane Graft Polyvinyl Alcohol Polymer]

The radically curable organosiloxane graft polyvinyl alcohol polymer of the present invention has both structural units represented by both of the following general formula (1) and general formula (2),

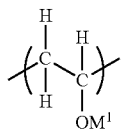
(1)

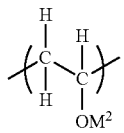
(2)

wherein, $M^1$ represents a siloxane group represented by the following general formula (3) and/or general formula (4); and $M^2$ represents an organic group having an unsaturated group represented by the following general formula (5),

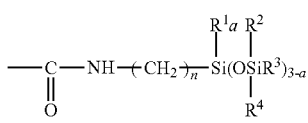
(3)

wherein, $R^1$, $R^2$, $R^3$, and $R^4$ each represent a monovalent organic group having 1 to 6 carbon atoms; "n" represents an integer of 1 to 10; and "a" represents an integer of 0 to 2,

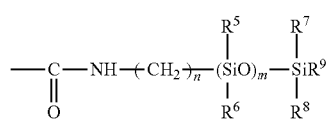
(4)

wherein, $R^5$, $R^6$, $R^7$, $R^8$, and $R^9$ each represent a monovalent organic group having 1 to 6 carbon atoms; "n" represents an integer of 1 to 10; and "m" represents an integer of 1 to 20,

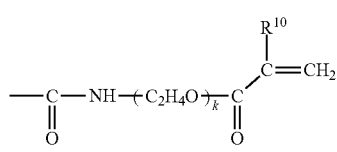
(5)

wherein, $R^{10}$ represents hydrogen or a methyl group; and "k" represents 1 or 2.

Further, it is preferable that the radically curable organosiloxane graft polyvinyl alcohol polymer of the present invention has a structural unit represented by the following general formula (6),

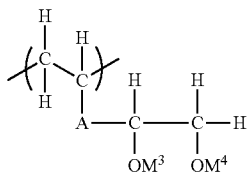
(6)

wherein, $M^3$ and $M^4$ each represent a hydrogen atom, an acetyl group or a siloxane group represented by the above general formula (3) and/or the general formula (4), at least one of which is a siloxane group represented by the above general formula (3) or general formula (4), and "A" represents a single bond or a linking group.

Here, $R^1$, $R^2$, $R^3$, $R^4$, $R^5$, $R^6$, $R^7$, $R^8$, and $R^9$ each independently represent a monovalent organic group having 1 to 6 carbon atoms, and specific examples thereof include an alkyl group such as a methyl group, an ethyl group, a propyl group, a butyl group and the like, a cycloalkyl group such as a cyclopentyl group, a cyclohexyl group and the like, an aryl group such as a phenyl group and the like, an alkenyl group such as a vinyl group, an allyl group and the like, and a substituted hydrocarbon group such as a chloromethyl group, a 3,3,3-trifluoropropyl group and the like, and $R^1$, $R^2$, $R^3$, $R^4$, $R^5$, $R^6$, $R^7$, $R^8$, and $R^9$ may be the same or different from each other. Also, $R^2$, $R^3$, and $R^4$ each may be a siloxy group represented by $—OSiR^7R^8R^9$, and examples of the siloxy group include a trimethylsiloxy group, an ethyldimethylsiloxy group, a phenyldimethylsiloxy group, a vinyldimethylsiloxy group, a chloromethyldimethyl-siloxy group, a 3,3,3-trifluoropropyldimethylsiloxy group, and the like.

Such a radically curable organosiloxane graft polyvinyl alcohol polymer is employed, by lowering high crystallinity of the polyvinyl alcohol, solubility in an organic solvent increases and reactivity with a modifying agent becomes higher, so that it becomes a material which is inexpensive and excellent.

By including the structural unit represented by the general formula (4) in the polyvinyl alcohol resin compound as the raw material of the radically curable organosiloxane graft polyvinyl alcohol polymer of the present invention, the polyvinyl alcohol resin becomes easily soluble in an organic solvent, and the reaction ratio with the compound represented by the general formula (6) is remarkably improved.

It is also preferable that "A" is a single bond in the general formula (6). The radically curable organosiloxane graft polyvinyl alcohol polymer in which "A" is a single bond is industrially more excellent in productivity.

In the general formula (3), it is preferable that $R^2$, $R^3$, and $R^4$ are methyl groups, n=3, and a=0, and such a radically curable organosiloxane graft polyvinyl alcohol polymer becomes a material more excellent in productivity, reactivity and the like.

In the general formula (4), it is preferable that $R^5$, $R^6$, $R^7$, and $R^8$ are methyl groups, $R^9$ is a butyl group, n=3, and m=4, and such a radically curable organosiloxane graft polyvinyl alcohol polymer becomes a material more excellent in productivity, reactivity and the like.

In the general formula (5), it is preferable that $R^{10}$ is a methyl group, and k=1, and such a radically curable organosiloxane graft polyvinyl alcohol polymer becomes a material more excellent in productivity, reactivity and the like.

A molecular weight of the radically curable organosiloxane graft polyvinyl alcohol polymer of the present invention may be in the range of 5,000 to 5,000,000 in terms of polystyrene-equivalent number average molecular weight (Mn) measured by GPC using tetrahydrofuran (THF) as a solvent, preferably 5,000 to 500,000, and more preferably 10,000 to 100,000. If the number average molecular weight is 5,000 or more, there is no fear that it is inferior in the point of film strength, while if number average molecular weight is 500,000 or less, there is no fear that it is inferior in the point of handleability or solubility.

As mentioned above, when the radically curable organosiloxane graft polyvinyl alcohol polymer of the present invention, it becomes a material having general properties such as film-forming property, transparency and the like of the polyvinyl alcohol, and properties such as high solubility in an organic solvent and excellent handleability as a liquid material of the silicone, and further properties such as solvent resistance and moldability of the obtained coating film. Therefore, it can be suitably used as cosmetics, adhesives, paints and the like.

[Process for Producing Radically Curable Organosiloxane Graft Polyvinyl Alcohol Polymer]

In the present invention, there is provided a process for producing the radically curable organosiloxane graft polyvinyl alcohol polymer of the present invention which comprises reacting at least a polyvinyl alcohol resin compound containing a structural unit represented by the following general formula (7), an organopolysiloxane containing an isocyanate group represented by the following general formula (8) and/or general formula (9), and an unsaturated compound containing an isocyanate group represented by the following general formula (10) with each other,

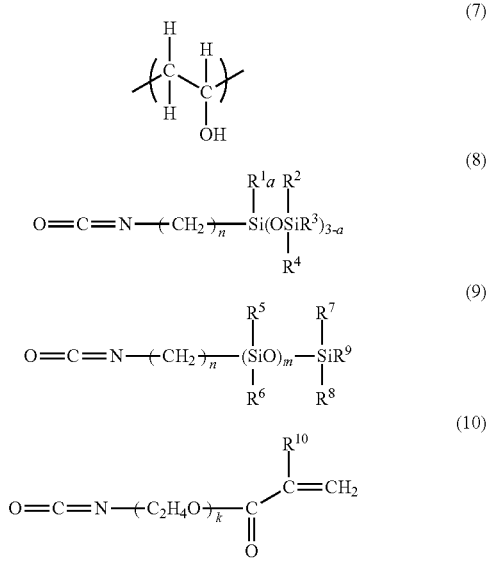

wherein, $R^1$, $R^2$, $R^3$, $R^4$, $R^5$, $R^6$, $R^7$, $R^8$, and $R^9$ each represent a monovalent organic group having 1 to 6 carbon atoms; $R^{10}$ represents hydrogen or a methyl group; and "k" represents 1 or 2; "n" represents an integer of 1 to 10; "m" represents an integer of 1 to 20; and "a" represents an integer of 0 to 2.

In addition, by reacting a polyvinyl alcohol resin compound containing a structural unit represented by the following general formula (11) as a polyvinyl alcohol resin compound, it is preferable since the polyvinyl alcohol resin is easily dissolved in an organic solvent, and the reaction ratio with the compounds represented by the general formulae (8), (9), and (10) is remarkably improved,

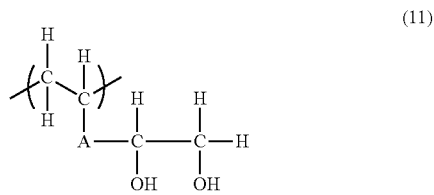

wherein, "A" represents a single bond or a linking group.

In addition, when the organopolysiloxane containing an isocyanate group represented by the general formula (8) is tris(trimethylsiloxy)silylpropyl isocyanate, $R^{10}$ of the unsaturated compound containing an isocyanate group is a methyl group in the general formula (10), and k=1, it is preferable since a radically curable organosiloxane graft polyvinyl alcohol polymer having a high modification ratio can be obtained efficiently from the viewpoints of productivity, and reactivity.

The polyvinyl alcohol resin compound containing a structural unit represented by the general formula (7) and a structural unit represented by the general formula (11) can be obtained, for example, by saponifying a polyvinyl acetate-based resin compound containing a structural unit represented by the following general formula (12) and a structural unit represented by the following general formula (13),

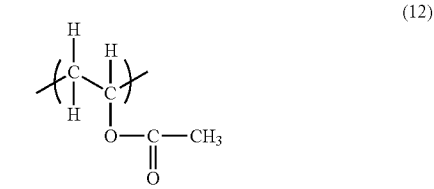

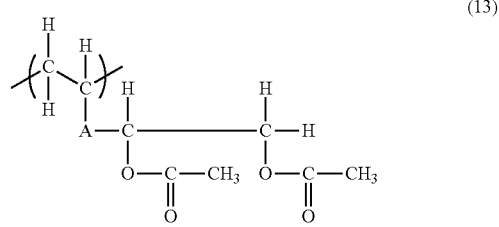

wherein, "A" represents the same meaning as before.

The polyvinyl alcohol resin compound used as a raw material in the process for producing the radically curable organosiloxane graft polyvinyl alcohol polymer can be obtained by saponifying the polyvinyl acetate-based compound, and as the polyvinyl alcohol resin compound, a partially saponified material may be also used.

When the radically curable organosiloxane graft polyvinyl alcohol polymer is synthesized by using a partially saponified polyvinyl alcohol resin compound, as a representative compound, it can be made a radically curable organosiloxane graft polyvinyl alcohol polymer containing a structural unit represented by the general formula (12) and a structural unit represented by the general formula (13).

The polyvinyl acetate-based resin compound containing the structural unit represented by the general formula (12) and the structural unit represented by the general formula (13) can be obtained by, for example, polymerizing a compound represented by the following general formula (14) and a compound represented by the following general formula (15),

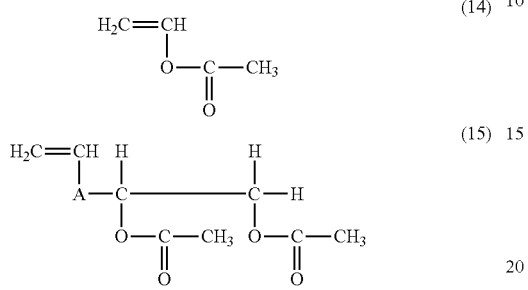

wherein, "A" represents the same meaning as before.

It is preferable that a molecular weight of the polyvinyl alcohol resin compound is suitably selected such that the molecular weight of the radically curable organosiloxane graft polyvinyl alcohol polymer of the present invention (that is, the number average molecular weight (Mn) in terms of polystyrene measured by GPC) is in the range of 5,000 to 5,000,000.

The polyvinyl alcohol resin compound is manufactured and sold as G-Polymer™ of The Nippon Synthetic Chemical Industry Co., Ltd., and it can be obtained. Specifically, it can be selected from AZF8035W, OKS-6026, OKS-1011, OKS-8041, OKS-8049, OKS-1028, OKS-1027, OKS-1109, and OKS-1083.

The process for producing the radically curable organosiloxane graft polyvinyl alcohol polymer of the present invention is carried out by reacting the hydroxyl group of the polyvinyl alcohol resin compound, the organopolysiloxane containing an isocyanate group and the unsaturated compound containing an isocyanate group together as mentioned above, and as the organopolysiloxane containing an isocyanate group, it is particularly preferable to use tris(trimethylsiloxy)silylpropyl isocyanate (that is, in the general formula (8), a material in which "n" represents 3, $R^2$, $R^3$, and $R^4$ are methyl groups, and "a" represents 0). As the unsaturated compound containing an isocyanate group, it is preferable to use Karenz MOI commercially available from Showa Denko K.K. (that is, a material in which $R^{10}$ of the unsaturated compound containing an isocyanate group represented by the general formula (10) is a methyl group, and k=1). By the reaction using these, the radically curable organosiloxane graft polyvinyl alcohol polymer having structural units represented by the following general formula (16) and general formula (17) can be produced,

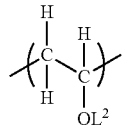

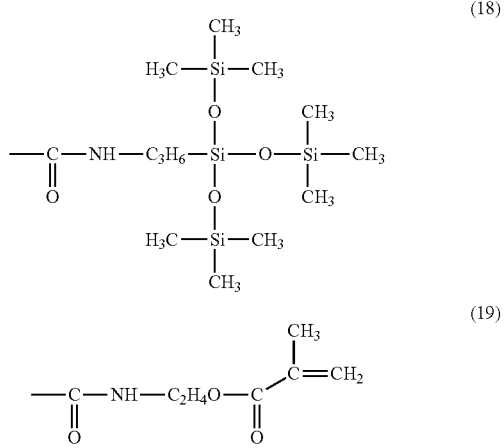

wherein, $L^1$ represents a siloxane group represented by the following general formula (18); and $L^2$ represents an organic group having an unsaturated group represented by the following general formula (19):

The radically curable organosiloxane graft polyvinyl alcohol polymer of the present invention is carried out by the reaction of the hydroxyl group of the polyvinyl alcohol resin compound with the organopolysiloxane containing an isocyanate group and the organic group having the unsaturated group as mentioned above, and it is preferable that the polyvinyl alcohol resin compound contains a polybutenediol structure (that is, a material in which "A" is a single bond in the general formula (6)). As long as it contains a polybutenediol structure, an organosiloxane graft polyvinyl alcohol polymer having high solubility in an organic solvent and a high modification ratio can be obtained with good efficiency. This is a material having a structural unit represented by the following general formula (20),

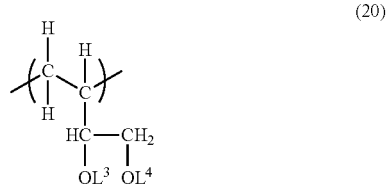

wherein, $L^3$ and $L^4$ each represent a hydrogen atom, an acetyl group, or a group represented by the above general formula (18) and/or (19), and at least one of which is a group represented by the above general formula (18) or the general formula (19).

The process for producing the radically curable organosiloxane graft polyvinyl alcohol polymer of the present invention is a producing process by the reaction of forming a urethane bond by reacting the hydroxyl group of the poly-

vinyl alcohol resin compound with the organopolysiloxane containing an isocyanate group and an organic group having an unsaturated group, so that it is not necessary to use specific reaction conditions or reaction apparatus, but it is preferable to use a solvent for mixing the polyvinyl alcohol resin compound and the compound containing an isocyanate group, reaction efficiency, and control of the reaction. Examples of the solvent include esters such as methyl acetate, ethyl acetate, butyl acetate, and the like, ketones such as acetone, methyl ethyl ketone, cyclohexanone and the like, aromatic hydrocarbons such as toluene, xylene and the like, ethers such as diethyl ether, tetrahydrofuran and the like, amides such as N,N-dimethylformamide, N-methylpyrrolidone and the like, and sulfoxides such as dimethylsulfoxide and the like, and these may be used singly or in admixture of two or more.

Although it varies depending on the kind of the solvent used here, this reaction may be usually carried out at 20 to 150° C. for 1 to 24 hours, and in this case, a conventionally known catalyst used for forming urethane bonds may be added, including amines such as triethylamine, triethylenediamine, N-methylmorpholine and the like, an organometallic compounds such as di-n-butyltin dilaurate, stannous oleate, and the like as a catalyst. After completion of the reaction, the objective radically curable organosiloxane graft polyvinyl alcohol polymer can be obtained by washing and drying.

Thus, according to the process for producing the radically curable organosiloxane graft polyvinyl alcohol polymer of the present invention, it is possible to more effectively react an isocyanate group having high reactivity and a hydroxyl group(s) of the polyvinyl alcohol resin compound. According to this procedure, the organosiloxane graft polyvinyl alcohol polymer of the present invention can be easily produced with good efficiency, and further it can be industrially obtained at low cost, that is, inexpensively.

EXAMPLE

Hereinafter, the present invention will be explained in more detail with reference to Examples and Comparative example, but the present invention is not limited by these.

Example 1

In a flask equipped with a dropping funnel, a condenser tube, a thermometer, and a stirring device, as the polyvinyl alcohol resin compound containing structural units represented by the general formula (7) and general formula (11), 4.6 g of G-Polymer (OKS-1011; polymerization degree: 300, saponification degree %: 98.5%) obtained from The Nippon Synthetic Chemical Industry Co., Ltd. was dissolved in 41 g of N-methylpyrrolidone, then, 12 g of tris(trimethylsiloxy)silylpropyl isocyanate, and 0.55 g of Karenz MOI (available from Showa Denko K.K.) were charged therein, and the reaction was carried out at 70° C. for 2 hours. After completion of the reaction, the product was precipitated in a mixed solution of water and methanol, further washed repeatedly with water and methanol mixed solution, and then dried under reduced pressure at 70° C. for 24 hours to obtain 15.0 g of a polymer. In the FIGURE, the results of IR analysis of this polymer are shown. From the results of the IR analysis, it was confirmed that the absorption of 2,270 $cm^{-1}$ of the isocyanate group almost disappeared and that the obtained polymer was a copolymer of polyvinyl alcohol tris(trimethylsiloxy)silylpropyl carbamate and polyvinyl alcohol ethyl methacrylate carbamate. The number average molecular weight (Mn) measured by GPC using THF as a solvent was 26,000 in terms of polystyrene, and the molecular weight distribution was 1.60. The obtained polymer was dissolved in dimethylacrylamide at 20% by mass, and a radically cured film was prepared by radical crosslinking by blending 0.5% by mass of benzoyl peroxide. The results of film-forming property, transparency, and oxygen permeability of the polymer of Example 1 and the radically cured film are shown in Table 1. The results of solubility (solvent resistance) in toluene and isopropyl alcohol are shown in Table 2.

Example 2

By using the same apparatus as in Example 1, when the reaction was carried out in the same manner as in Example 1 except for using G-Polymer (OKS-1083; polymerization degree: 1,900, saponification degree %: 99.8%) obtained from The Nippon Synthetic Chemical Industry Co., Ltd. as the polyvinyl alcohol resin compound containing structural units represented by the general formula (7) and general formula (11), then 15.1 g of a polymer was obtained. The number average molecular weight (Mn) measured by GPC using THF as a solvent was 85,000 in terms of polystyrene and the molecular weight distribution was 1.60. The obtained polymer was dissolved in dimethylacrylamide at 20% by mass, and a radically cured film was prepared by radical crosslinking by blending 0.5% by mass of benzoyl peroxide. The results of film-forming property, transparency, and oxygen permeability of the polymer of Example 2 and the radically cured film are shown in Table 1. The results of solubility (solvent resistance) in toluene and isopropyl alcohol are shown in Table 2.

Example 3

By using the same apparatus as in Example 1, when the reaction was carried out in the same manner as in Example 2 except for using 24 g of tris(trimethylsiloxy)silylpropyl isocyanate, then 27.1 g of a polymer was obtained. The number average molecular weight (Mn) measured by GPC using THF as a solvent was 135,000 in terms of polystyrene and the molecular weight distribution was 1.70. The results of solubility of the obtained polymer in various kinds of solvents are shown in Table 1. The obtained polymer was dissolved in dimethylacrylamide at 20% by mass, and a radically cured film was prepared by radical crosslinking by blending 0.5% by mass of benzoyl peroxide. The results of film-forming property, transparency, and oxygen permeability of the polymer of Example 3 and the radically cured film are shown in Table 1. The results of solubility (solvent resistance) in toluene and isopropyl alcohol are shown in Table 2.

Comparative Example 1

By using the same apparatus as in Example 1, when the reaction was carried out in the same manner as in Example 1 except for not using Karenz MOI (available from Showa Denko K.K.), then 14.8 g of a polymer was obtained. The number average molecular weight (Mn) measured by GPC using THF as a solvent was 24,000 in terms of polystyrene and the molecular weight distribution was 1.60. The obtained polymer was dissolved in dimethylacrylamide at 20% by mass, and a radically cured film was prepared by radical crosslinking by blending 0.5% by mass of benzoyl peroxide. The results of film-forming property, transparency, and oxygen permeability of the polymer of Comparative example 1 and the radically cured film are shown in Table 1. The results of solubility (solvent resistance) in toluene and isopropyl alcohol are shown in Table 2.

The results of film-forming property, transparency, and oxygen permeability of G-Polymer (OKS-1011, OKS-1083) alone are shown in Table 1. The results of solubility (solvent resistance) in toluene and isopropyl alcohol are shown in Table 2.

TABLE 1

|  | Film formability | Transparency | Oxygen permeability (Barrer) |
|---|---|---|---|
| G-Polymer; OKS-1011 | good | good | <0.1 |
| G-Polymer; OKS-1083 | good | good | <0.1 |
| Example 1 (Polymer) | good | good | 110 |
| Example 1 (Radically cured film) | good | good | — |
| Example 2 (Polymer) | good | good | 108 |
| Example 2 (Radically cured film) | good | good | — |
| Example 3 (Polymer) | good | good | 144 |
| Example 3 (Radically cured film) | good | good | — |
| Comparative example 1 (Polymer) | good | good | 120 |
| Comparative example 1 (Radically cured film) | good | good | — |

TABLE 2

|  | Solubility in toluene | Solubility in isopropyl alcohol |
|---|---|---|
| G-Polymer; OKS-1011 | insoluble | insoluble |
| G-Polymer; OKS-1083 | insoluble | insoluble |
| Example 1 (Polymer) | dissolved | dissolved |
| Example 1 (Radically cured film) | insoluble (swelling) | insoluble (swelling) |
| Example 2 (Polymer) | dissolved | dissolved |
| Example 2 (Radically cured film) | insoluble (swelling) | insoluble (swelling) |
| Example 3 (Polymer) | dissolved | dissolved |
| Example 3 (Radically cured film) | insoluble (swelling) | insoluble (swelling) |
| Comparative example 1 (Polymer) | dissolved | dissolved |
| Comparative example 1 (Radically cured film) | dissolved | dissolved |

As shown in Table 1, in Example 1 to 3, the reaction was carried out efficiently with a silicone modifying agent so that radically curable organosiloxane graft polyvinyl alcohol polymers having structural units represented by the general formula (1) and general formula (2) of the present invention could be obtained, and in any case, film property and transparency were high, and further, high oxygen permeability was shown by grafting silicone.

In Table 2, all of the products obtained in Examples 1 to 3 have excellent solubility in toluene and isopropyl alcohol, it was understood that they have excellent handleability as a liquid material.

Further, it was understood that the cured films in which the radically curable organosiloxane graft polyvinyl alcohol polymers obtained from Examples 1 to 3 were radically crosslinked with dimethylacrylamide had undergone intermolecular crosslinking, became insoluble in toluene and isopropyl alcohol, and had solvent resistance.

On the other hand, in Comparative example 1 having no structural unit represented by the general formula (2), it was understood that even when it was radically crosslinked with dimethylacrylamide, the obtained cured film had solubility in toluene and isopropyl alcohol.

From the above results, it was shown that the radically curable organosiloxane graft polyvinyl alcohol polymer of the present invention had general properties such as film-forming property, transparency and the like of the polyvinyl alcohol, had excellent handleability as a liquid material since solubility in an organic solvent was high, and further, had both of solvent resistance and moldability of the obtained coating film, and could be produced with a low cost.

It must be stated here that the present invention is not restricted to the embodiments shown by Examples. The embodiments shown by Examples are merely examples so that any embodiments composed of substantially the same technical concept as disclosed in the claims of the present invention and expressing a similar effect are included in the technical scope of the present invention.

The invention claimed is:
1. A radically curable organosiloxane graft polyvinyl alcohol polymer which comprises structural units represented by both of the following general formula (1) and general formula (2),

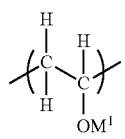

(1)

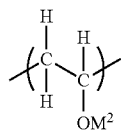

(2)

wherein, $M^1$ represents a siloxane group represented by the following general formula (3) and/or general formula (4); and $M^2$ represents an organic group having an unsaturated group represented by the following general formula (5),

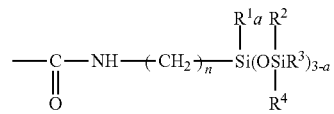

(3)

wherein, $R^1$, $R^2$, $R^3$, and $R^4$ each represent a monovalent organic group having 1 to 6 carbon atoms; "n" represents an integer of 1 to 10; and "a" represents an integer of 0 to 2,

(4)

wherein, $R^5$, $R^6$, $R^7$, $R^8$, and $R^9$ each represent a monovalent organic group having 1 to 6 carbon atoms; "n" represents an integer of 1 to 10; and "m" represents an integer of 1 to 20,

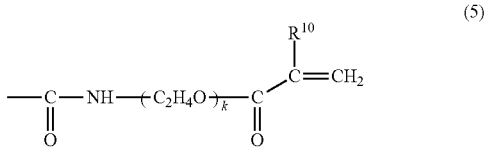
(5)

wherein, $R^{10}$ represents hydrogen or a methyl group; and "k" represents 1 or 2.

2. The radically curable organosiloxane graft polyvinyl alcohol polymer according to claim 1, wherein the polymer further has a structural unit represented by the following general formula (6),

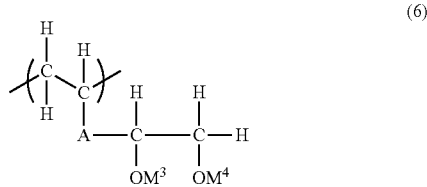
(6)

wherein, $M^3$ and $M^4$ each represent a hydrogen atom, an acetyl group or a siloxane group represented by the above general formula (3) and/or the general formula (4), at least one of which is a siloxane group represented by the above general formula (3) or general formula (4), and "A" represents a single bond or a linking group.

3. The radically curable organosiloxane graft polyvinyl alcohol polymer according to claim 1, wherein the radically curable organosiloxane graft polyvinyl alcohol polymer has a number average molecular weight (Mn) of 5,000 to 500,000 as measured by GPC in terms of polystyrene.

4. The radically curable organosiloxane graft polyvinyl alcohol polymer according to claim 2, wherein the radically curable organosiloxane graft polyvinyl alcohol polymer has a number average molecular weight (Mn) of 5,000 to 500,000 as measured by GPC in terms of polystyrene.

5. The radically curable organosiloxane graft polyvinyl alcohol polymer according to claim 1, wherein $R^2$, $R^3$, and $R^4$ are methyl groups, n=3, and a=0 in the general formula (3).

6. The radically curable organosiloxane graft polyvinyl alcohol polymer according to claim 2, wherein $R^2$, $R^3$, and $R^4$ are methyl groups, n=3, and a=0 in the general formula (3).

7. The radically curable organosiloxane graft polyvinyl alcohol polymer according to claim 3, wherein $R^2$, $R^3$, and $R^4$ are methyl groups, n=3, and a=0 in the general formula (3).

8. The radically curable organosiloxane graft polyvinyl alcohol polymer according to claim 1, wherein $R^5$, $R^6$, $R^7$, and $R^8$ are methyl groups, $R^9$ is a butyl group, n=3, and m=4 in the general formula (4).

9. The radically curable organosiloxane graft polyvinyl alcohol polymer according to claim 2, wherein $R^5$, $R^6$, $R^7$, and $R^8$ are methyl groups, $R^9$ is a butyl group, n=3, and m=4 in the general formula (4).

10. The radically curable organosiloxane graft polyvinyl alcohol polymer according to claim 3, wherein $R^5$, $R^6$, $R^7$, and $R^8$ are methyl groups, $R^9$ is a butyl group, n=3, and m=4 in the general formula (4).

11. The radically curable organosiloxane graft polyvinyl alcohol polymer according to claim 1, wherein $R^{10}$ is a methyl group, and k=1 in the general formula (5).

12. The radically curable organosiloxane graft polyvinyl alcohol polymer according to claim 2, wherein $R^{10}$ is a methyl group, and k=1 in the general formula (5).

13. The radically curable organosiloxane graft polyvinyl alcohol polymer according to claim 3, wherein $R^{10}$ is a methyl group, and k=1 in the general formula (5).

14. A process for producing a radically curable organosiloxane graft polyvinyl alcohol polymer which comprises reacting at least a polyvinyl alcohol resin compound containing a structural unit represented by the following general formula (7), an organopolysiloxane containing an isocyanate group represented by the following general formula (8) and/or general formula (9), and an unsaturated compound containing an isocyanate group represented by the following general formula (10) with each other,

(7)

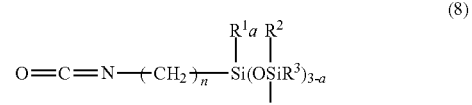
(8)

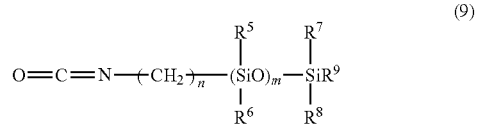
(9)

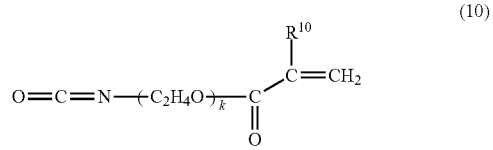
(10)

wherein, $R^1$, $R^2$, $R^3$, $R^4$, $R^5$, $R^6$, $R^7$, $R^8$, and $R^9$ each represent a monovalent organic group having 1 to 6 carbon atoms; $R^{10}$ represents hydrogen or a methyl group; and "k" represents 1 or 2; "n" represents an integer of 1 to 10; "m" represents an integer of 1 to 20; and "a" represents an integer of 0 to 2.

15. The process for producing a radically curable organosiloxane graft polyvinyl alcohol polymer according to claim 14, wherein a polyvinyl alcohol resin compound having a structural unit represented by the following general formula (11) is further reacted,

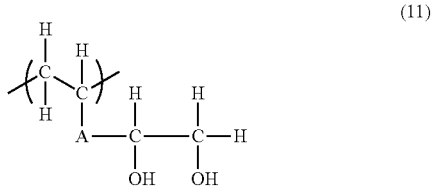
(11)

wherein, "A" represents a single bond or a linking group.

16. The process for producing a radically curable organosiloxane graft polyvinyl alcohol polymer according to claim 14, wherein the organopolysiloxane containing an isocyanate group represented by the general formula (8) is tris(trimethylsiloxy)silylpropyl isocyanate, and in the unsaturated compound containing an isocyanate group represented by the general formula (10), $R^{10}$ is a methyl group, and k=1.

17. The process for producing a radically curable organosiloxane graft polyvinyl alcohol polymer according to claim 15, wherein the organopolysiloxane containing an isocyanate group represented by the general formula (8) is tris(trimethylsiloxy)silylpropyl isocyanate, and in the unsaturated compound containing an isocyanate group represented by the general formula (10), $R^{10}$ is a methyl group, and k=1.

\* \* \* \* \*